UNITED STATES PATENT OFFICE.

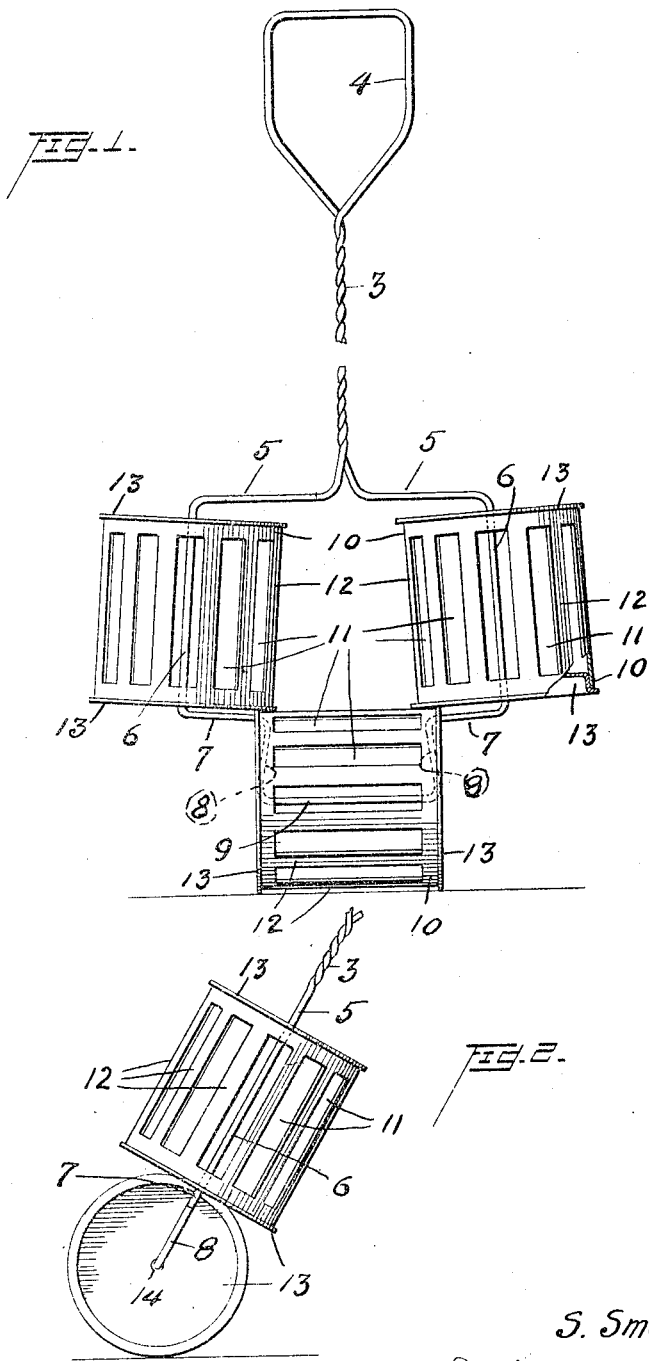

STANLEY SMIGIELSKI, OF DETROIT, MICHIGAN.

TRUNDLE TOY.

1,323,921.   Specification of Letters Patent.   Patented Dec. 2, 1919.

Application filed September 15, 1919. Serial No. 323,716.

*To all whom it may concern:*

Be it known that I, STANLEY SMIGIELSKI, a citizen of Poland, residing at Detroit, in the county of Wayne and State of Michigan, have invented certain new and useful Improvements in Trundle Toys, of which the following is a specification.

The primary object of the present invention resides in the provision of a trundle toy wherein a plurality of cage members are journaled upon a wire carrying member with one of said cage members having rolling contact with the ground and adapted for rotating the other cage members by having frictional contact therewith, the operation of the device being highly amusing to children with the effect produced by the rotation of the cage members being attractive and pleasing to the eye.

With the above general objects in view, and others that will appear as the nature of the invention is better understood, the device consists of the novel construction combination and arrangement of parts to be hereinafter more fully described and then claimed, reference being had to the accompanying drawing by like characters designating corresponding parts throughout the several views, in which, Figure 1 is a front elevational view of a trundle toy constructed in accordance with the present invention, the handle being broken away and with one of the cage members partly shown in section, and Fig. 2 is a side elevational view of the same with the handle broken away.

Referring more in detail to the accompanying drawing, there is illustrated a wire cage supporting member in the form of a wire comprising a twisted relatively long portion 3 having a looped handle 4 at its outer end, the inner ends of the twisted portion 3 being separated and bent to substantially rectangular form embodying laterally extending parts 5 having the outer portions thereof bent substantially at right angles thereto to provide slightly converging sides 6, which sides are bent inwardly toward each other as at 7. The inwardly bent portions 7 are further bent at 8 in directions outwardly therefrom and are connected by the bar 9 extending substantially in parallelism to the bent portions 5. It will be observed that a substantially rectangular frame is provided with the several bends 5 to 7.

Circular cages are journaled on the sections 6 and 9 and each includes a cylindrical body portion 10 provided with a plurality of longitudinal slots 11 defining spaced bars 12, the opposite ends of the tubular members 10 being closed by end caps 13 having alined openings 14 therein to facilitate the journaling of the cage members on the wire frame above described.

As clearly illustrated in Fig. 1, the wire cages 10 journaled upon the sections 6 have the peripheral edges thereof in rolling contact with the outer face of the cage 10 upon the section 9 so that during the trundling movement of the toy, rotary movement of the lower cage 10 is communicated to the upper cages upon the sections 6 which operation presents an exceptionally amusing device for a child.

While there is herein shown and described the preferred embodiment of the present invention, it is to be understood that minor changes may be made therein without departing from the spirit and scope of the invention as claimed.

What is claimed as new is:—

A trundle toy embodying a wire frame bent to substantially rectangular form, an offset portion carried by the outer side of said rectangular frame, a cage journaled on said offset portion, a cage journaled upon each side of said rectangular frame and in rolling contact with the aforesaid cage whereby all of said cages are adapted simultaneously to revolve.

In testimony whereof I affix my signature.

STANLEY SMIGIELSKI.